(12) United States Patent
Nolte

(10) Patent No.: US 11,350,783 B2
(45) Date of Patent: Jun. 7, 2022

(54) HOT WATER DISPENSER AND METHOD FOR DETERMINING A BOILING POINT OF WATER OF A HOT WATER DISPENSER

(71) Applicant: Stiebel Eltron GmbH & Co. KG, Holzminden (DE)

(72) Inventor: Hubert Nolte, Höxter (DE)

(73) Assignee: STIEBEL ELTRON GMBH & CO. KG, Holzminden (DE)

(*) Notice: Subject to any disclaimer, the term of this patent is extended or adjusted under 35 U.S.C. 154(b) by 648 days.

(21) Appl. No.: 16/221,748

(22) Filed: Dec. 17, 2018

(65) Prior Publication Data

US 2020/0187701 A1 Jun. 18, 2020

(51) Int. Cl.
*A47J 27/21* (2006.01)
*F24H 9/20* (2022.01)

(52) U.S. Cl.
CPC ... *A47J 27/21083* (2013.01); *A47J 27/21091* (2013.01); *F24H 9/2014* (2013.01)

(58) Field of Classification Search
CPC .......... G05D 23/1931; G05D 23/1951; G05D 23/1902; G05D 23/2033; G05D 23/1912; G05D 23/24; G05D 23/27543; G05D 11/16; G05D 23/1917; F24D 19/1051; F24D 19/0092; F24D 19/1054; F24D 19/1063; F24D 17/02; F24D 17/0073; F24D 17/0031; F24D 17/00; F24D 17/0078; E03C 1/0411; E03C 1/044; D06F 75/12; D06F 75/26; D06F 75/16; F22B 35/00; F22B 1/285; F22B 1/28; F22D 5/26; A47J 31/56; A47J 31/545; A47J 31/542; A47J 27/62; A47J 27/04; A47J 31/469; A47J 31/34; A47J 31/106; A47J 31/54; A47J 31/58; F24H 9/0015; F24H 9/1818; F24H 4/04; F24H 9/0047; H05B 3/44; H05B 1/0269; H05B 3/82; H05B 3/30; H05B 1/0283; H05B 1/0244; H05B 3/746; H05B 6/1209; H05B 6/062; H05B 3/78; H05B 3/80;
(Continued)

(56) References Cited

U.S. PATENT DOCUMENTS

2008/0257281 A1* 10/2008 Pepper ................. F24H 9/2021
374/100

FOREIGN PATENT DOCUMENTS

DE 10 2013 004 275 9/2013
DE 102013004275 A1 * 9/2013 ........ A47J 27/21091

* cited by examiner

*Primary Examiner* — Joel M Attey
*Assistant Examiner* — Rachel R Rizzo
(74) *Attorney, Agent, or Firm* — Haug Partners LLP

(57) ABSTRACT

A hot water dispenser and a method for determining a boiling point of water in the same. The hot water dispenser contains a reservoir, a heating element, and a sensor. The method includes heating water in the reservoir with a first power value of the heating element during a first period of time until a value indicative of a threshold temperature of water is determined; upon reaching the threshold temperature, heating the reservoir water with a second power value of the heating element, which is lower than the first power value, during a second period of time until a water-temperature-rise-per-time value is lower than a first predetermined value; subsequently, increasing the power value of the heating element to a third power value during a third period of time; determining the boiling-point temperature of water by determining the highest temperature of water between the first and third periods of time.

14 Claims, 3 Drawing Sheets

(58) Field of Classification Search
CPC . C02F 1/02; C02F 1/008; C02F 5/086; G01K 11/02; C23F 13/005; C23F 13/04; C23F 13/06; F25B 30/02; F25B 47/02; G01D 1/16; G01N 25/08; F24C 15/106; F24C 3/126
USPC .............................................................. 392/4
See application file for complete search history.

HOT WATER DISPENSER AND METHOD FOR DETERMINING A BOILING POINT OF WATER OF A HOT WATER DISPENSER

FIELD OF THE INVENTION

It is noted that citation or identification of any document in this application is not an admission that such document is available as prior art to the present invention.

The present invention relates to a hot water dispenser as well as a method for determining a boiling point of water in a hot water dispenser.

Hot water dispensers are widely used in residential and industrial applications. Hot water dispensers, with which a temperature of up to 85° C. is made available, are known from the state-of-the-art and are used in offices, households and small businesses.

Furthermore, hot water dispensers are known which supply boiling water at a temperature of approximately 100° C. Such hot water dispensers, in particular, are used to provide hot water at a temperature as close as possible to the boiling point. The reservoir of the hot water dispenser, in which the water to be heated is filled, can be pressureless or pressure-resistant.

In the pressure-resistant version, a vacuum-insulated stainless steel reservoir is typically provided in which the water is heated to 110° C. and maintained in standby mode through a hysteresis effect. The 110° C. hot water is taken from the reservoir via a pressure-resistant tube and expands to typically 100° C. in the outlet of the tube.

With the pressureless, open reservoir version of a hot water dispenser the hot water outlet is open, in particular valve-free, for supplying hot water with an atmospheric air pressure. An atmospheric air pressure is present at the hot water outlet, preferably at least when the cold water inlet is closed. Since atmospheric air pressure is present, the boiling point of the water depends on the air pressure at the installation site. To avoid boiling of the water in the reservoir of the hot water dispenser (heating until all the water in the reservoir of the hot water dispenser has evaporated or until a safety temperature limiter responds), a maximum water temperature is set in the reservoir of the hot water dispenser. This maximum temperature is sometimes significantly below the boiling point and is set manually or fixed, for example to 90° C., in order to ensure that the preset temperature is below the boiling point even if the water starts boiling at a relatively low temperature, for instance at high geodetic elevations.

DE 10 2013 004 275 A1 describes a system where the boiling point of water in a hot water dispenser is detected with an electronic circuit and a temperature sensor. The system identifies the boiling point water temperature during a heat up operation by observing the temperature gradient of the heat up operation and monitoring the maximum boiling temperature while the gradient is close to zero. It also defines a lower water temperature set point than the detected boiling temperature after the boiling point of the water has been detected by the electronic device of the hot water dispenser. In DE 10 2013 004 275 A1 it is also disclosed that the duration for the detection event of the boiling hot water temperature needs to be 30 seconds in order to detect a valid boiling temperature of water. It is a disadvantage that during the 30 second period, boiling hot steam is penetrating out of the tap. This causes a scalding risk for the user and also consumes more electricity than necessary.

In known applications, non-pressurized hot water dispensers need a temperature control knob to set the water temperature of the water heater to a well preset temperature level to avoid dry firing on the one hand and to achieve approximate boiling hot water on the other hand. This is because the boiling temperature level itself depends on the elevation or the geodetic height where the non-pressurized water heater is installed. The atmospheric pressure has also a minor influence on the boiling temperature level. For higher geodetic height installation, the temperature set point is reduced by turning the knob to a lower temperature setting or by already providing a low predefined maximum temperature set point of, for example, 90° C., to avoid a dry firing of the hot water dispenser.

It has been therefore an objective of the present invention to provide a hot water dispenser and a method for determining a boiling point of water of a hot water dispenser which allows a reliable determination of the boiling point of water and also reduces the detection duration of the true boiling point in order to reduce the amount of steam coming out of the tap as well as electricity consumption.

SUMMARY OF THE INVENTION

According to a first aspect, a method is provided for determining a boiling point of water in a hot water dispenser. The hot water dispenser contains a reservoir, a heating element controlled by a controlling device, and a sensor. The method comprises the following steps: heating up water in the reservoir with a first power value of the heating element during a first period of time until a value indicative of a threshold temperature of water is determined; upon reaching the threshold temperature, heating up water in the reservoir with a second power value of the heating element which is lower than the first power value of the heating element during a second period of time until a value indicative of a temperature rise of water per time is lower than a first predetermined value; subsequently, increasing the power value of the heating element to a third power value during a third period of time; determining the boiling point temperature of water by determining the temperature after the third period of time.

The above wording "upon" and "subsequently" refers to a period of time and should not be construed as limiting in any way; "upon" and "subsequently" also include immediately afterwards, but also at a later time, wherein it may also be desirable to have a power value which is non-constant over time, such as for instance, decreasing as a function of temperature and/or time.

An advantage of the present invention is the reduced detection duration of the true boiling point of water heated in the reservoir of the hot water dispenser, and therefore the reduced amount of steam coming out of the tap which leads to increased safety issues for the user of the hot water dispenser.

In some embodiments, the third period of time is lower than or equal to 10 s, preferably lower than or equal to 2 s.

In some embodiments, the heating element is shut off as soon as the water temperature rise per time in the third period of time approximates zero.

In the context of this application, the temperature rise per time approximates zero if a determined value of the water temperature differs from the previously determined, e.g. one second earlier, value of the water temperature by less than 0.2 K, preferably by less than 0.1 K and particularly preferred by less than 0.05 K.

In some embodiments, the second power value of the heating element is 2 to 10 times, preferably 4 times lower than the first power value of the heating element.

In some embodiments, the first power value of the heating element is the maximum power value.

In some embodiments, the first power value of the heating element is equal to the third power value of the heating element.

In some embodiments, the reservoir is open to atmosphere.

In some embodiments, the controlling device is an electronic controlling device.

In some embodiments, the threshold temperature is in a range of 60° C. and 95° C., preferably approximately 90° C. The term approximately with respect to a temperature value is employed to refer to the range of up to 1 K to both sides of the indicated temperature value.

According to a further aspect a method is provided for determining a set point temperature of a hot water dispenser is provided. The method comprises determining a boiling point temperature according to the first aspect, wherein the set point temperature of water is determined by subtracting a fixed temperature value from the determined boiling point temperature of water.

In some embodiments, the fixed temperature value is two kelvins.

According to a further aspect, a hot water dispenser is provided. The hot water dispenser comprises: a reservoir, a heating element located in the reservoir a sensor inside the reservoir, and a controlling device, wherein the controlling device is configured to determine a boiling point temperature according to the first aspect.

Compared to the state-of-the-art devices, the invention further has the advantage that the tap temperature is as close to the boiling point as possible without the risk of the reservoir boiling. It is therefore not necessary to keep the temperature of the water well below the boiling point to be on the safe side. In contrast to the state-of-the-art, the invention provides water that boils almost regardless of where the appliance is installed and which air pressure conditions prevail, which is a great advantage for the user. For example, if the appliance is installed at sea level with a normal boiling temperature of approx. 100° C., the controller calibrates itself to a temperature of approx. 98° C.; for example, if the device is installed at a geodetic height of 1000 m, at which water usually boils at approximately 96.7° C., the controller calibrates itself to a temperature of approximately 94.7° C.

The advantages and embodiments of the invention are explained in more detail below with reference to the drawings.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
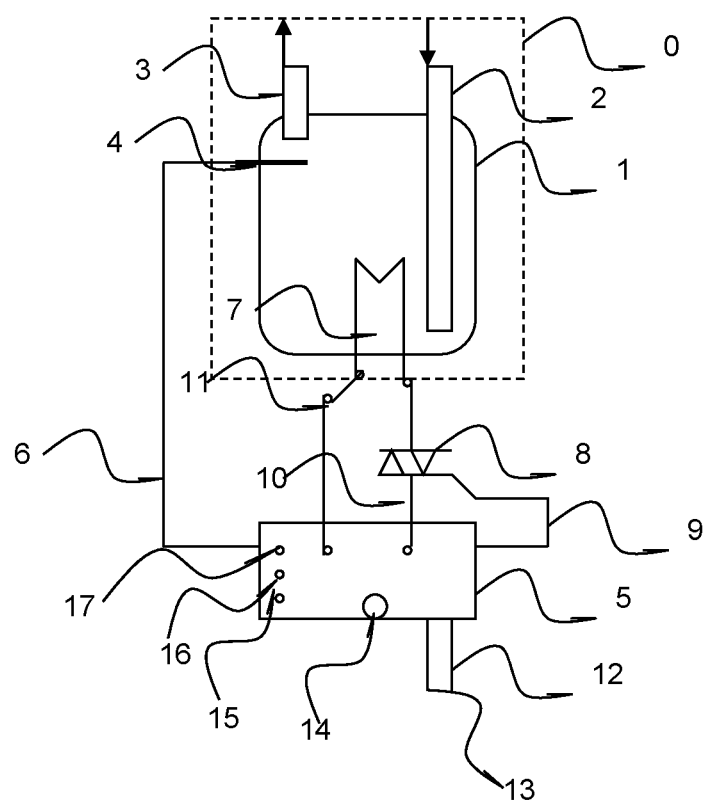
FIG. 1 schematically and exemplarily illustrates a hot water dispenser according to the present invention.

FIG. 1 schematically and exemplarily illustrates a hot water dispenser according to an embodiment of the present invention. The hot water dispenser comprises a tank assembly 0 which comprises a water reservoir 1 with a cold water inlet tube 2 and a hot water outlet tube 3. The tank assembly 0 also has a sleeve or an insert for a sensor 4, preferably arranged near the bottom of reservoir 1, which is connected to an electronics board 5 via a wire 6 and is used for determining a temperature of water in reservoir 1. A heating element 7 is positioned in reservoir 1, preferably on the bottom of reservoir 1, which is controlled by the firing rate of a triac 8. The triac 8, which is controlled by a power electronics circuit, is connected to the electronics board 5 via a control wire 9 and a supply wire 10. Furthermore, a safety cut off 11 provides safety in case of a controller failure or a dry fire.

A heater assembly comprises a heating element 7, electronics board 5, and two wires 12, 13, wherein the heater assembly is connected to an electric grid via the two wires 12, 13. Furthermore, a push button 14, used for starting the hot water dispenser, is located on the electronics board 5 which is accessible via an enclosure window of the electronics board 5 for a user. In addition, LED's 15, 16, 17 are positioned on the electronic board 5 to be activated in different operation modes preset by the user via the push button 14 and shown on the enclosure front surface of the electronics board 5.

For instance, LED 15 is activated during the boiling point detection. LED 16 is activated during a so called sleep function with reduced temperature settings and LED 17 is activated during heat up or flashing during a shut off failure. A venturi nozzle system for a displacement of the expansion of water during heat up is not shown in FIG. 1, but may be integrated as well. Of course, the shown arrangement of LEDs 15, 16, 17 is just an example and should not be interpreted as limiting in any way.

Figure 2:
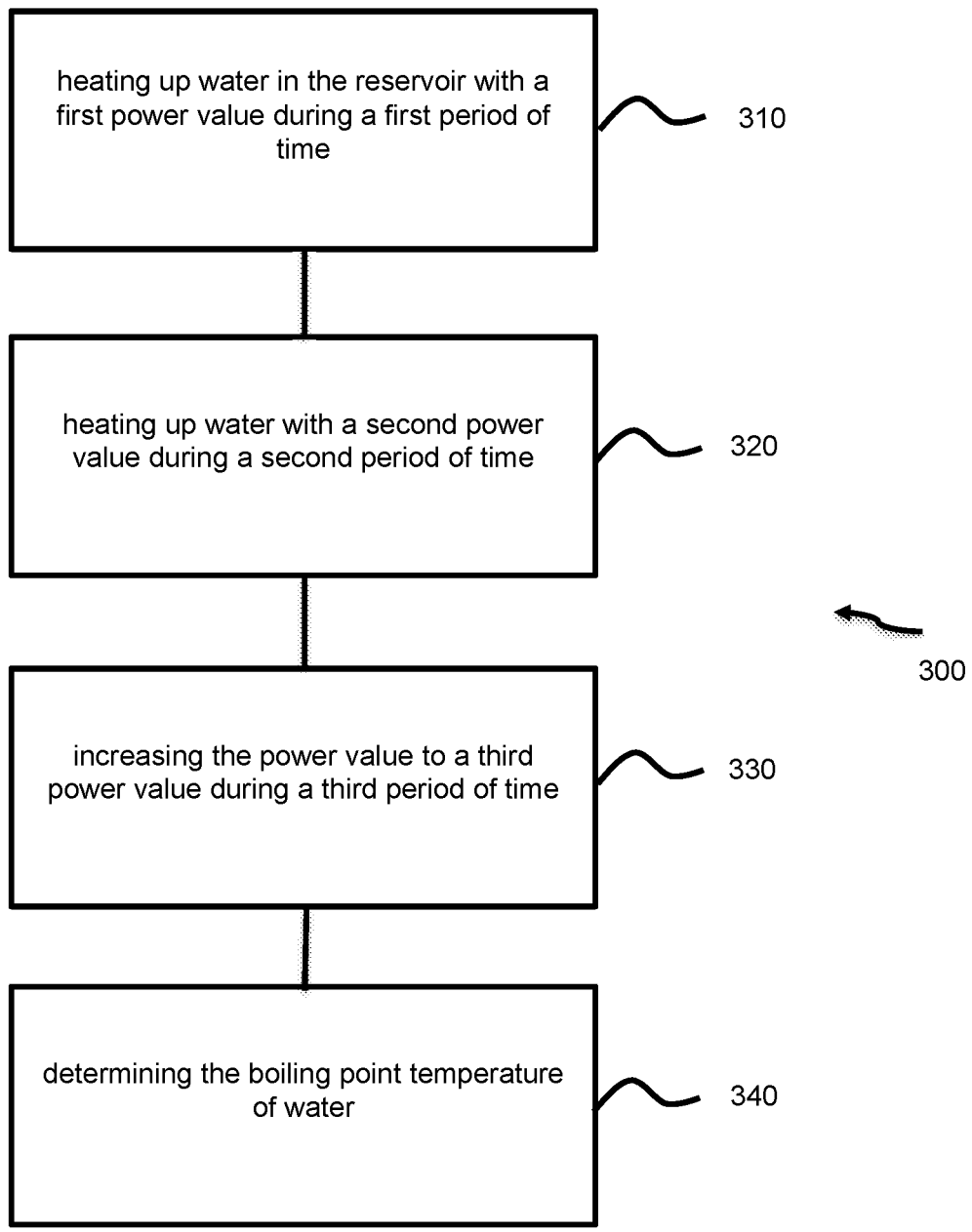
FIG. 2 shows a flow chart diagram illustrating a method for determining a boiling point of water in a hot water dispenser according to the present invention.

FIG. 2 shows a flow chart diagram illustrating a method 300 for determining a boiling point of water in a hot water dispenser.

The method 300 comprises a step 310 of heating up water in the reservoir 1 with a first power value of the heating element 7 during a first period of time until a value is determined indicative of a threshold temperature of water.

Upon reaching the threshold temperature, in a step 320 water in the reservoir 1 is heated up with a second power value of the heating element 7 which is lower than the first power value of the heating element 7 during a second period of time until a value indicative of a temperature rise of water per time is lower than a first predetermined value.

Subsequently, in a step 330, the power value of the heating element 7 is increased to a third power value during a third period of time.

In a step 340, the boiling point temperature of water is determined by determining the temperature after the third period of time. Consequently, the highest temperature during first, second, and third period of time is determined as the boiling point temperature.

Figure 3:
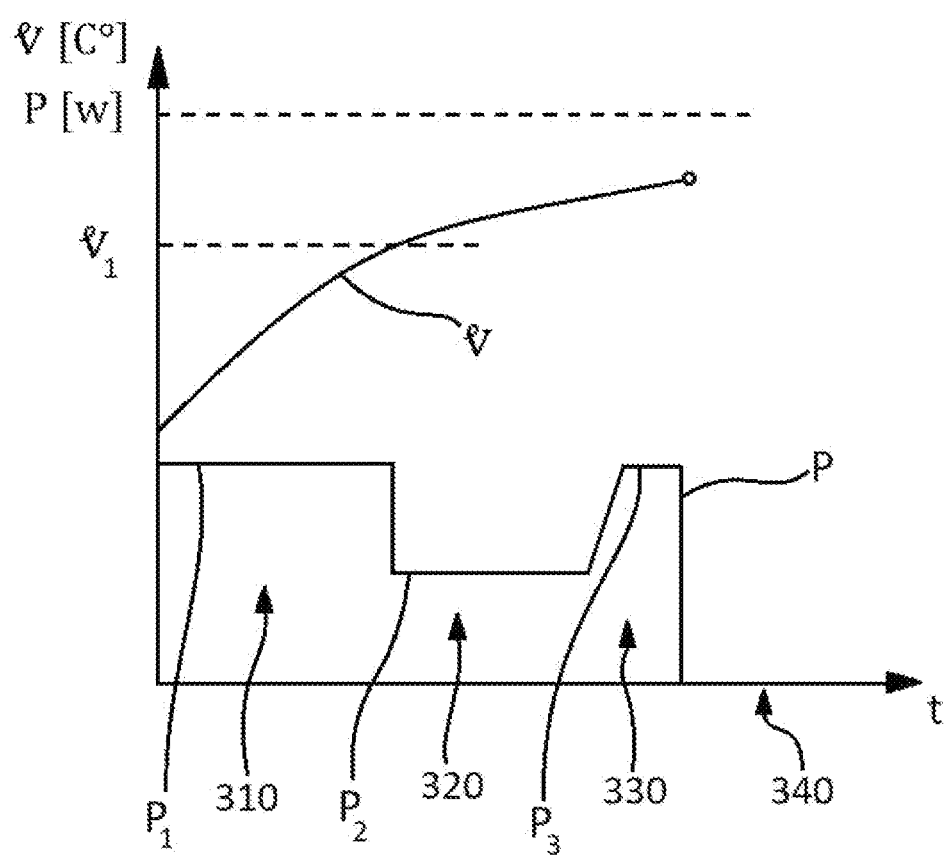
FIG. 3 illustrates the boiling point detection method, where the heat up for the boiling point detection is shown with the time on the X-axis, and the temperature and the power value on the Y-axis.

An effect of the boiling point detection method 300 is shown in FIG. 3, where the heating up for the boiling point detection is shown with the time on the X-axis, and the water temperature $\vartheta$ in ° C. and heating power value P in W, respectively, on the Y-axis.

First, water in the reservoir 1 of the hot water dispenser is heated up in step 310 via at least one heating element 7 during a first period of time until a well-defined value $\vartheta_1$ indicative of a threshold temperature of water, for instance 90° C., is determined by the sensor 4. The threshold temperature can vary depending on the different boiling point temperatures which depend on the installation elevations of the hot water dispenser. The heat up until the threshold temperature is reached is accomplished with a first power value $P_1$, preferably with full power. The measured temperature values are then obtained by integration of the sensor signals over a certain period of time, e.g. in the range of several milliseconds to seconds.

Once the sensor 4 determines the threshold temperature $\vartheta_1$, the power value of the heating element 7 is reduced to a second power value $P_2$ in a step 320, which is two to ten times, preferably four times, lower than the first power value $P_1$, during a second period of time.

The heat-up from the threshold temperature close to the adequate boiling temperature happens with the reduced second power value $P_2$ provided from the power electronics circuit with reduced firing rate until a value indicative of a temperature rise of water per time is lower than a predetermined value. The predetermined value hereby corresponds to approximately zero.

Subsequently, in the step 330, the power value of the heating element 7 is increased to a third power value $P_3$ during a third period of time. While the power value is increased to the third power value $P_3$ and no temperature rise is determined, the resultant highest temperature value of the water is valid to be declared as boiling temperature.

Lastly, in step 340, the power of the heating element 7 is shut off and a set point calculation using the determined boiling temperature as maximum follows. The set point temperature of water is determined by subtracting a fixed temperature value, for instance 2 kelvins, from the determined boiling temperature of water.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

LIST OF REFERENCE NUMBERS 0 water reservoir assembly
1 reservoir
2 cold water inlet tube
3 hot water outlet tube
4 sensor
5 electronic board
6 wire
7 heating element
8 triac
9 control wire
10 supply wire
11 safety cut off
12, 13 wire
14 push button
15, 16, 17 LED
P power
$\vartheta$ temperature
t time

The invention claimed is:

1. A method for determining a boiling-point temperature of water in a hot water dispenser, the hot water dispenser containing a reservoir, a heating element controlled by a controlling device, and a sensor, the method comprising the steps of:
heating up water in the reservoir with a first power value of the heating element during a first period of time until a value indicative of a threshold temperature of water is determined;
upon reaching the threshold temperature, heating up water in the reservoir with a second power value of the heating element, which is lower than the first power value of the heating element, during a second period of time;
subsequently, increasing the power value of the heating element to a third power value during a third period of time; and
determining the boiling-point temperature of water by determining the highest obtained temperature of water between the first period of time and the third period of time.

2. The method for determining a boiling-point temperature of water used in a hot water dispenser according to claim 1;
wherein the third period of time is less than or equal to 10 seconds.

3. The method for determining a boiling-point temperature of water used in a hot water dispenser according to claim 1;
wherein the heating element is shut off as soon as the water temperature rise per time in the third period of time approximates zero.

4. The method for determining a boiling-point temperature of water used in a hot water dispenser according to claim 1;
wherein the second power value of the heating element is 2 to 10 times lower than the first power value of the heating element.

5. The method for determining a boiling point temperature of water used in a hot water dispenser according to claim 4;
wherein the second power value of the heating element is 4 times lower than the first power value of the heating element.

6. The method for determining a boiling-point temperature of water used in a hot water dispenser according to claim 1;
wherein the first power value of the heating element is a maximum power value.

7. The method for determining a boiling-point temperature of water used in a hot water dispenser according to claim 1;
wherein the first power value of the heating element is equal to the third power value of the heating element.

8. The method for determining a boiling-point temperature of water used in a hot water dispenser according to claim 1;
wherein the reservoir is open to atmosphere.

9. The method for determining a boiling-point temperature of water used in a hot water dispenser according to claim 1;
wherein the controlling device is an electronic controlling device.

10. The method for determining a boiling-point temperature of water used in a hot water dispenser according to claim 1;
   wherein the threshold temperature is in a range of 60° C. and 95° C.

11. The method for determining a boiling-point temperature of water used in a hot water dispenser according to claim 1;
   wherein the threshold temperature is approximately 90° C.

12. The method
   according to claim 1, wherein the method further comprises determining the set point temperature of the hot water dispenser by subtracting a fixed temperature value from the determined boiling-point temperature of water.

13. The method according to claim 12;
   wherein the subtracted fixed temperature value is two Kelvin.

14. The method for determining a boiling-point temperature of water used in a hot water dispenser according to claim 2;
   wherein the third period of time is less than or equal to 2 seconds.

* * * * *